United States Patent [19]
Labaziewicz

[11] Patent Number: 5,210,560
[45] Date of Patent: May 11, 1993

[54] CAMERA WITH FINGER OVER THE TAKING LENS/FLASH UNIT SENSOR

[75] Inventor: Peter Labaziewicz, Rochester, N.Y.

[73] Assignee: Eastman Kodak Company, Rochester, N.Y.

[21] Appl. No.: 872,578

[22] Filed: Apr. 23, 1992

[51] Int. Cl.[5] ............... G03B 17/38; G03B 15/03; G03B 13/02
[52] U.S. Cl. ................. 354/268; 354/149.11; 354/219; 354/289.1
[58] Field of Search ............ 354/149.11, 219, 268, 354/288, 289.1

[56] References Cited

U.S. PATENT DOCUMENTS

| 3,878,548 | 4/1975 | Ettischer | 354/268 |
| 4,547,054 | 10/1985 | Bridges | 354/268 |
| 4,866,470 | 9/1989 | Arai et al. | 354/289.1 X |

Primary Examiner—Michael L. Gellner
Assistant Examiner—J. K. Han
Attorney, Agent, or Firm—Roger A. Fields

[57] ABSTRACT

In a camera, one photosensor is located next to the taking lens and another photosensor is located next to a built-in flash unit for sensing whether a camera user's fingers are obstructing the taking lens and/or the flash unit.

9 Claims, 2 Drawing Sheets

CAMERA WITH FINGER OVER THE TAKING LENS/FLASH UNIT SENSOR

BACKGROUND OF THE INVENTION

1. Field of the Invention

The invention relates generally to the field of photography, and in particular to apparatus in a photographic camera for detecting that a camera user's finger (or other portion of the user's hand) may be in front of a taking lens or a built-in flash unit.

2. Description of the Prior Art

As photographic cameras get smaller in size, it becomes more likely that a camera user may inadvertently position a finger in front of the taking lens or a built-in flash unit before the user depresses the shutter release button to take a picture. Should the user take a picture with a finger over the taking lens or the flash unit, the picture will of course be ruined.

Various designs have been proposed for preventing the camera user from positioning a finger in front of the taking lens. For example, U.S. Pat. No. 4,866,470, issued Sep. 12, 1989, suggests surrounding a lens opening in the front face of the camera body with a large number of small projections which, when touched, alert the camera user that at least one of his or her fingers may be positioned over the taking lens.

Another example, U.S. Pat. No. 4,547,054, issued Oct. 15, 1985, suggests surrounding a lens opening in the front face of the camera body with a pressure-sensitive plate which, when touched, is slightly tilted to energize a warning lamp. The energized lamp alerts the camera user that at least one of his or her fingers may be positioned over the taking lens.

SUMMARY OF THE INVENTION

According to the invention, a photographic camera comprising a camera body having a front face and a taking lens inset in the camera body to not project outwardly substantially from the front face, is characterized in that:

photosensor means is located in the vicinity of the taking lens for emitting a light beam towards a camera user's finger that may be positioned over the taking lens and for detecting reflection of the light beam from the camera user's finger; and alarm means is connected to the photosensor means for providing a warning that a camera user's finger may be positioned over the taking lens when the photosensor means detects reflection of a light beam from the camera user's finger.

DETAILED DESCRIPTION OF THE PREFERRED EMBODIMENT

The invention is described as being embodied in a 35 mm still camera with a built-in electronic flash unit. Because such a type of camera is well known, this description is directed in particular only to those elements forming part of or cooperating directly with the preferred embodiment. It is to be understood, however, that other elements not specifically shown or described may take forms known to persons of ordinary skill in the art.

Figure 1:
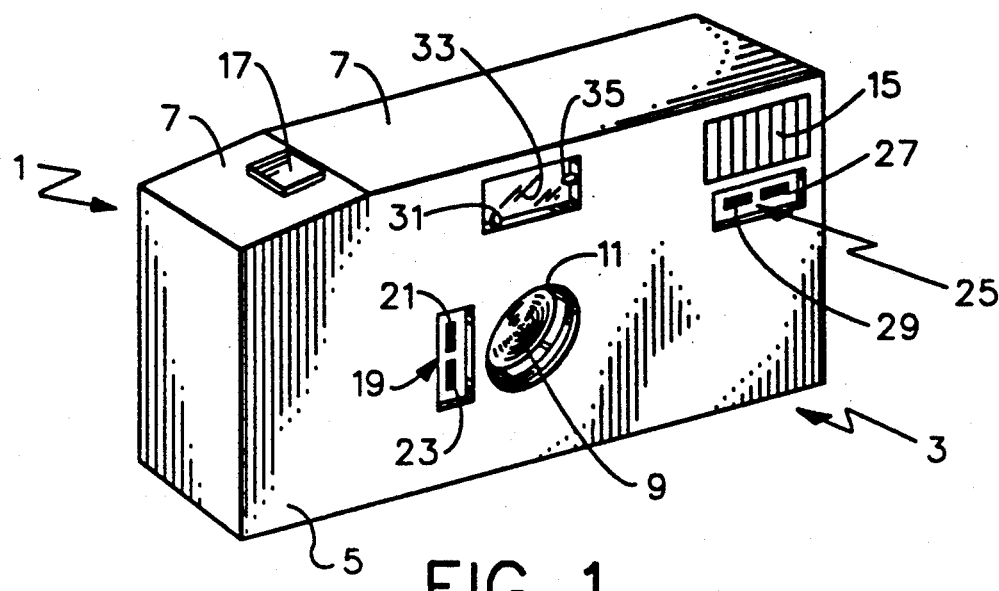
FIG. 1 is a front perspective view of a photographic camera with respective photosensors for detecting that a camera user's finger may be positioned over the taking lens and/or a built-in flash unit, according to a preferred embodiment of the invention.
Figure 3:
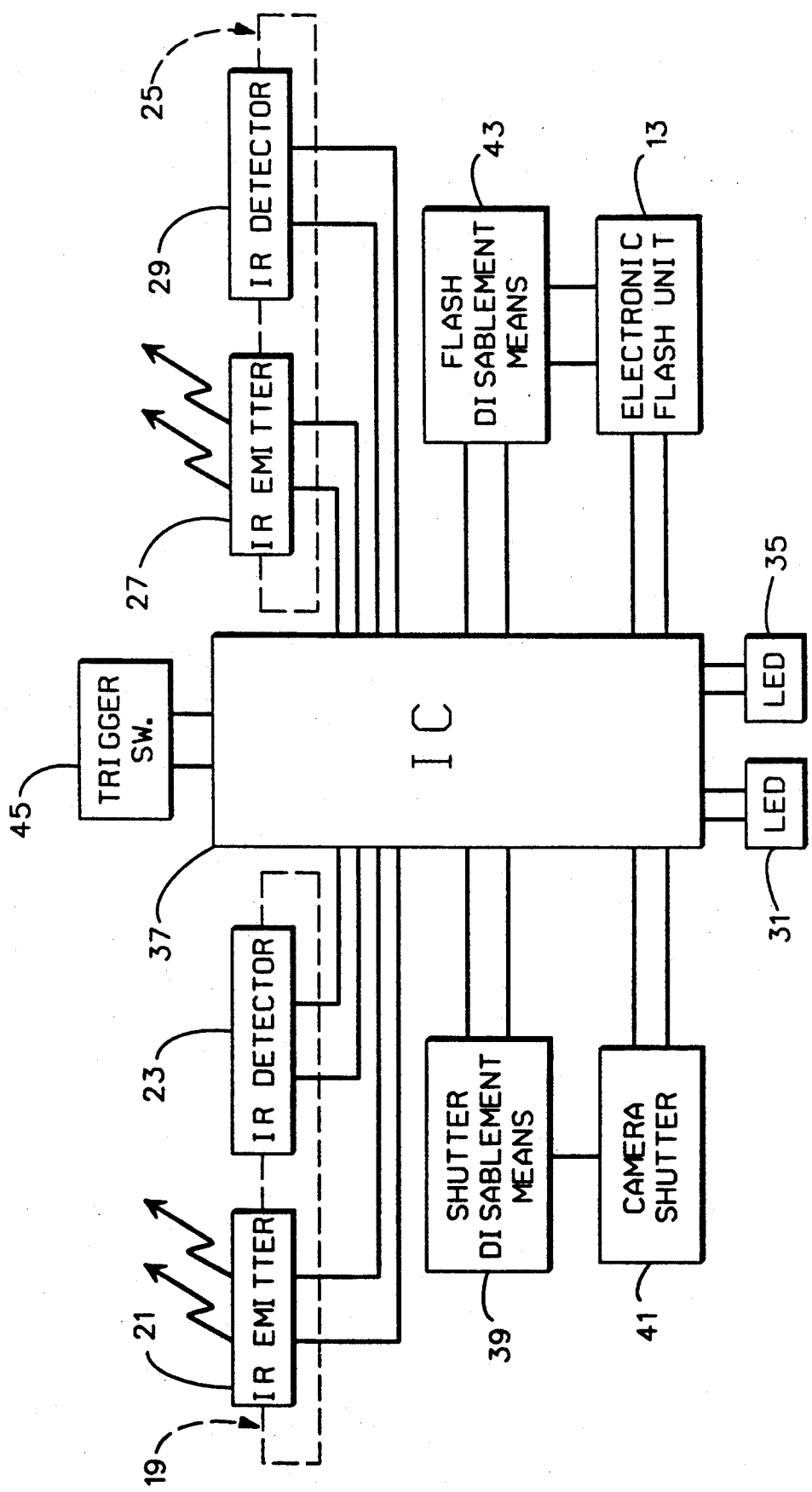
FIG. 3 is a schematic view of an electronic circuit including the photosensors.

Referring now to the drawings, FIG. 1 shows a 35 mm still camera 1 with a camera body 3 having a front face 5 and a top face 7. A taking lens 9 is inset behind an opening 11 in the front face 5 of the camera body 3 to not project outwardly beyond the front face. A conventional built-in electronic flash unit 13, shown only in FIG. 3, is located behind a flash emission window 15 in the front face 5 of the camera body 3. A shutter release button 17 is supported by known means, not shown, for manually depression at the top face 7 of the camera body 3 to take a picture.

Figure 2:
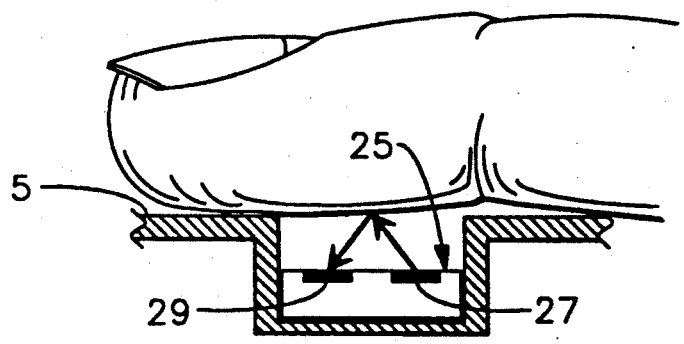
FIG. 2 is an elevation view of one of the photosensors, illustrating its manner of operation.

According to the invention, a first photosensor 19 is located in the vicinity of the opening 11 to the taking lens 9. See FIG. 1. The first photosensor 19 includes an infrared (IR) emitter 21 for emitting a beam of infrared light towards a camera user's finger that may be positioned over the taking lens 9 and an infrared (IR) detector 23 for detecting reflection of the beam of infrared light from the camera user's finger. A second photosensor 25 is located in the vicinity of the flash emission window 15. The second photosensor 25 includes an infrared (IR) emitter 27 for emitting a beam of infrared light towards a camera user's finger that may be positioned over the flash illumination window 15 and an infrared (IR) detector 29 for detecting reflection of the beam of infrared light from the camera user's finger. See FIG. 2. A first light-emitting diode (LED) 31 is located to be seen in a camera viewfinder 33 for providing a warning visible in the viewfinder that a camera user's finger may be positioned over the taking lens 9. A second light-emitting diode (LED) is located to be seen in the viewfinder 33 for providing a warning visible in the viewfinder that a camera user's finger may be positioned over the flash illumination window 15. The first and second LED's 31 and 35 are connected to the first and second photosensors 19 and 25 via an integrated circuit (IC) 37. See FIG. 3. Known shutter disablement means 39 is connected to the first and second photosensors 19 and 25 via the IC 37 for disabling a conventional camera shutter 41, to prevent the taking of a picture, when the IR detector 23 of the first photosensor detects reflection of a beam of infrared light from a camera user's finger that may be positioned over the taking lens 9 and/or when the IR detector 29 of the second photosensor detects reflection of a beam of infrared light from a camera user's finger that may be positioned over the flash illumination window 15. Preferably, known flash disablement means 43 is connected to the first and second photosensors 19 and 25 via the IC 37 for disabling the flash unit 13, to prevent its use, when the IR detector 23 of the first photosensor detects reflection of a beam of infrared light from a camera user's finger that may be positioned over the taking lens 9 and/or when the IR detector of the second photosensor detects reflection of a beam of infrared light from a camera user's finger that may be positioned over the flash illumination window 15.

OPERATION

When the shutter release button 17 is manually depressed to take a picture, it closes a trigger switch 45 connected to the first and second photosensors 19 and 25 via the IC 37. See FIG. 3. This causes the IR emitter 21 of the first photosensor 19 and the IR emitter 27 of the second photosensor 25 to emit respective beams of infrared light. If, however, known ambient light sensing means, not shown, determines that flash illumination of the subject is not required, the second photosensor 25 is prevented from operating, i.e. the IR emitter 27 of the second photosensor will not emit a beam of infrared light.

If the IR detector 23 of the first photosensor 19 detects reflection of a beam of infrared radiation from a camera user's finger that may be positioned over the taking lens 9 and/or the IR detector 29 of the second photofinisher 25 detects reflection of a beam of infrared radiation from a camera user's finger that may be positioned over the flash illumination window 15, the shutter disablement means 39 will disable the camera shutter 41 and the flash disablement means 43 will disable the flash unit 43 (assuming the ambient light sensing means determines that flash illumination of the subject is required). Morever, the first LED 31 and/or the second LED 35 will provide a warning visible in the viewfinder 33.

The invention has been described with reference to a preferred embodiment. However, it will be appreciated that variations and modifications can be effected within the ordinary skill in the art without departing from the scope of the invention.

I claim:

1. A photographic camera comprising a camera body having a front face and a taking lens inset in said camera body to not project outwardly substantially from said front face, is characterized in that:
    photosensor means is located in the vicinity of said taking lens for emitting a light beam towards a camera user's finger that may be positioned over the taking lens and for detecting reflection of the light beam from the camera user's finger; and
    alarm means is connected to said photosensor means for providing a warning that a camera user's finger may be positioned over said taking lens when the photosensor means detects reflection of a light beam from the camera user's finger.

2. A photographic camera as recited in claim 1, further comprising a shutter release button supported on said camera body for manual depression to take a picture and a trigger switch that changes state responsive to manual depression of said shutter release button, and wherein said photosensor means is connected to said trigger switch to emit a light beam towards a camera user's finger that may be positioned over said taking lens when the trigger switch changes state responsive to manual depression of said shutter release button.

3. A photographic camera as recited in claim 2, further characterized in that:
    shutter disablement means is connected to said photosensor means for preventing the taking of a picture when the photosensor means detects reflection of a light beam from a camera user's finger that may be positioned over said taking lens.

4. A photographic camera as recited in claim 1, further comprising a camera viewfinder, and wherein said alarm means includes a light-emitting diode located to be seen in said viewfinder for providing a warning visible in the viewfinder that a camera user's finger may be positioned over said taking lens when said photosensor means detects reflection of a light beam from the camera user's finger.

5. A photographic camera as recited in claim 1, wherein said photosensor means includes an infrared emitter for emitting a beam of infrared light towards a camera user's finger that may be positioned over said taking lens and an infrared detector for detecting reflection of the beam of infrared light from the camera user's finger.

6. A photographic camera comprising a camera body having a front face, a taking lens inset in said camera body to not project outwardly substantially from said front face, and an electronic flash unit inset in said camera body to not project outwardly substantially from said front face, is characterized in that:
    first photosensor means is located in the vicinity of said taking lens for emitting a light beam towards a camera user's finger that may be positioned over the taking lens and for detecting reflection of the light beam from the camera user's finger;
    second photosensor means is located in the vicinity of said flash unit for emitting a light beam towards a camera user's finger that may be positioned over the flash unit and for detecting reflection of the light beam from the camera user's finger; and
    alarm means is connected to said first photosensor means and to second photosensor means for providing a warning that a camera user's finger may be positioned over said taking lens when the first photosensor means detects reflection of a light beam from the camera user's finger or that a camera user's finger may be positioned over said flash unit when photosensor means detects reflection of a light beam from the camera user's finger.

7. A photographic camera as recited in claim 6, further characterized in that:
    disablement means is connected to said first photosensor means and to said second photosensor means for preventing the taking of a picture when the first photosensor means detects reflection of a light beam from a camera user's finger that may be positioned over said taking lens or the second photosensor means detects reflection of a light beam from a camera user's finger that may be positioned over said flash unit.

8. A photographic camera as recited in claim 6, wherein said alarm means includes first alarm means connected to said first photosensor means for providing a warning that a camera user's finger may be positioned over said taking lens when the first photosensor means detects reflection of a light beam from the camera user's finger and second alarm means connected to said second photosensor means for providing a warning that a camera user's finger may be positioned over said flash unit when the second photosensor means detects reflection of a light beam from the camera user's finger.

9. A photographic camera comprising a camera body having a front face, and an electronic flash unit inset in said camera body to not project outwardly substantially from said front face, is characterized in that:
    photosensor means is located in the vicinity of said flash unit for emitting a light beam towards a camera user's finger that may be positioned over the flash unit and for detecting reflection of the light beam from the camera user's finger; and
    alarm means is connected to said photosensor means for providing a warning that a camera user's finger may be positioned over said flash unit when the photosensor means detects reflection of a light beam from the camera user's finger.

* * * * *

UNITED STATES PATENT AND TRADEMARK OFFICE
CERTIFICATE OF CORRECTION

PATENT NO. : 5,210,560
DATED : May 11, 1993
INVENTOR(S) : Peter Labaziewicz

It is certified that error appears in the above-identified patent and that said Letters Patent is hereby corrected as shown below:

Col. 4, line 31          add --the second-- between "when and "photosensor"

Signed and Sealed this

Fifteenth Day of March, 1994

Attest:

BRUCE LEHMAN

Attesting Officer      Commissioner of Patents and Trademarks